June 4, 1968  J. M. LIEBIG  3,386,746
OIL SEAL
Filed June 14, 1961
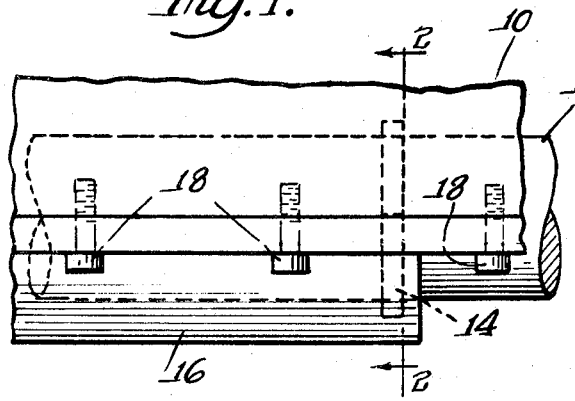
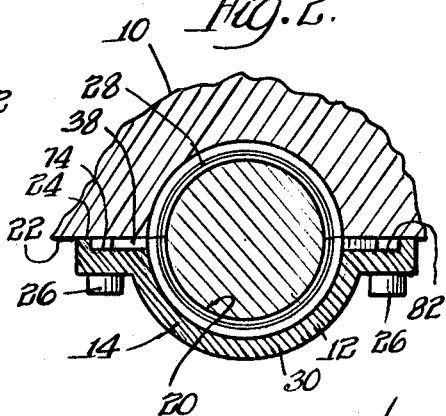
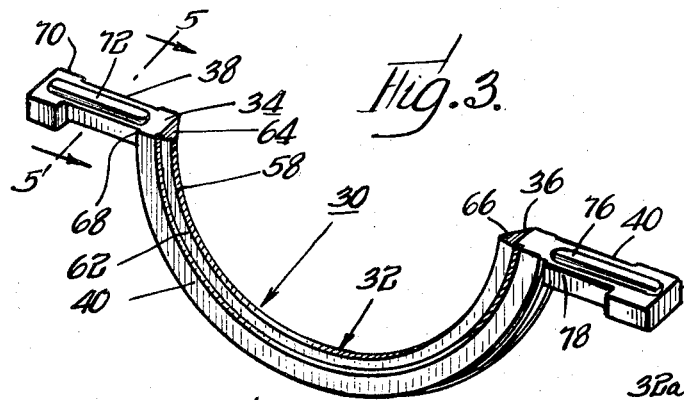
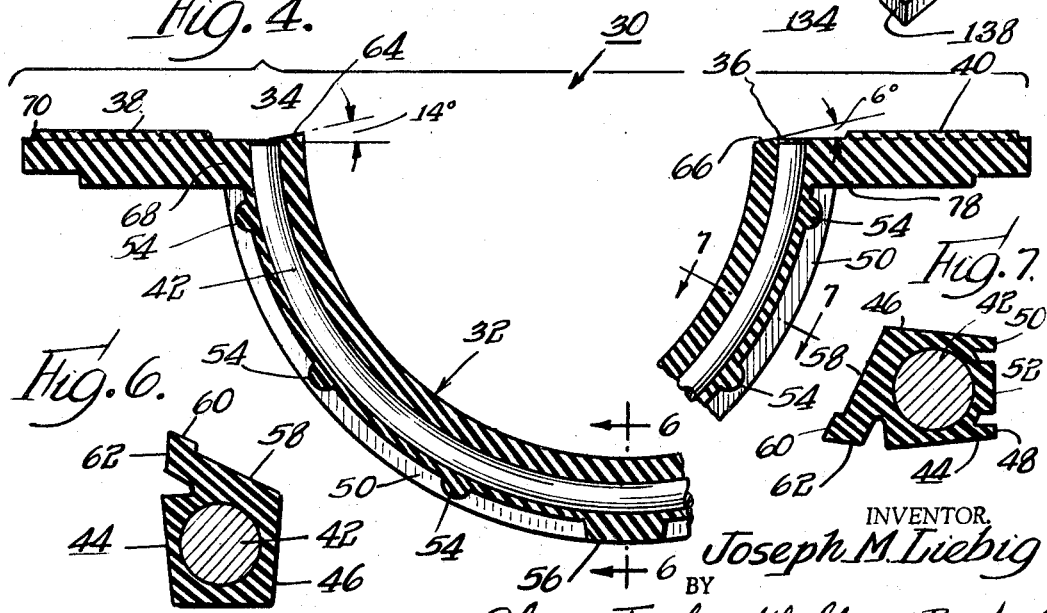
INVENTOR.
Joseph M. Liebig
BY
Olson, Trexler, Wolters & Bushnell
attys.

3,386,746
OIL SEAL

Joseph M. Liebig, Wheaton, Ill., assignor, by mesne assignments, to Vare Corporation, New York, N.Y., a corporation of Delaware
Filed June 14, 1961, Ser. No. 117,153
2 Claims. (Cl. 277—207)

This invention relates to seals for preventing the escape of fluids from a housing defined by complementary members which are drawn together to form a circular opening through which a rotatable shaft projects, and more particularly the invention pertains to improved means for eliminating seepage of fluids from between the mating surfaces of the complementary housing members.

In my prior patent application, Ser. No. 39,491, filed June 29, 1960, now Patent No. 3,106,406, I have proposed providing, internal combustion engines of the reciprocating type with an annular seal split into halves disposed adjacent to the rear main bearing of the crank shaft. The upper half or segment of the split seal is supported within a groove in the engine block, and the lower half or segment of the seal may be carried by a separate member such as a seal cap, the rear main bearing cap, the oil pan or the like, so as to afford a sealed housing adjacent to the rear main journal of the crank shaft. It is readily perceived that the aforementioned housing is defined by complementary members having mating surfaces in engagement along a parting line disposed parallel to the longitudinal axis of the crank shaft journal, each housing member embracing a semi-circular portion of the shaft.

When the mating surfaces are perfectly flat or complementary or when the fluid pressure of the lubricant is moderately low, a split type seal as disclosed in my aforementioned patent application is adequate to prevent the fluid from leaking or seeping between the mating surfaces in the direction radially of the crank shaft. However, when the fluid pressure of the lubricant is high or the mating surfaces are somewhat irregular, the lubricant escapes in a radial direction between the abutting ends of the split ring seals and seeps out of the housing between the irregular mating surfaces. Further the lubricant may tend to leak between the mating surfaces in a direction axially of the shaft and radially outwardly of the seal. Obviously, this condition is undesirable not only in that it results in depletion of the lubricant supply, but also because it affords a "short circuit" in the lubricating system. It may result in failure of clutches of the dry disc type, and it results in a dirty engine that drips on the garage floor.

In view of the foregoing, it is an important object of this invention to provide an improved seal which prevents the escape of fluid from between the mating surfaces of a shaft housing.

Another object of this invention is to provide an improved sealing means for obviating leakage of lubricants under pressure radially of a shaft.

Still another object of this invention is to provide an improved semi-annular seal having means thereof adapted to be supported by a first shaft housing member cooperating with a second shaft housing member to prevent seepage of lubricating oil therebetween.

Concomitant with the aforementioned object, it is yet another object of the invention to provide deformable means disposed radially of the longitudinal axis of the crank shaft to confine fluid lubricants within the crank shaft housing.

A further object of the invention is to provide an improved sealing means for the rear main bearing of a reciprocating internal combustion engine which is highly practical in use, economical to manufacture, and which affords effective barrier against the escape of lubricants over a long life.

Further features of the invention pertain to the particular arrangements of the elements thereof whereby the above-outlined and additional operating features are attained.

The invention, both as to its organization and method of operation, together with further objects and advantages thereof, will best be understood by reference to the following specification taken in connection with the accompanying drawing wherein like reference numerals designate like parts throughout in which:

FIGURE 1 is a fragmentary view in elevation showing a portion of an internal combustion engine block and crank shaft adjacent to the rear main bearing and depicting in broken lines an oil seal made in accordance with and embodying the principles of the present invention;

FIG. 2 is a transverse sectional view taken in the direction of the arrows along the line 2—2 in FIG. 1 and illustrating particularly the housing member which supports the oil seal of the present invention;

FIG. 3 is an enlarged perspective view of the oil seal of the present invention;

FIG. 4 is a greatly enlarged, fragmentary view showing further features of the invention in cross section;

FIG. 5 is a further enlarged sectional view taken generally in the direction of the arrows along the line 5—5 in FIG. 3;

FIG. 6 is a still further enlarged sectional view taken generally in the direction of the arrows along the line 6—6 in FIG. 4;

FIG. 7 is a sectional view in the scale of FIG. 6 taken generally in the direction of the arrows along the line 7—7 in FIG. 4; and FIG. 8 is a fragmentary perspective view of a second form of the seal of the present invention.

Referring now to FIGS. 1 and 2 of the drawing, there is shown an engine block 10 having a crank shaft 12 rotatably supported thereon by a structure including a bearing cap 14, the bearing cap 14 and the crank shaft 12 being disposed above an oil pan 16 secured to the block 10 by a plurality of the fasteners 18. It is to be appreciated that the engine block 10 and the bearing cap 14 are complementary members which when drawn together form a circular opening 20 through which the rotatable crank shaft 12 extends. Being complementary, a mating surface 22 on the block 10 engages a corresponding mating surface 24 on the bearing cap 14 when the cap 14 is urged by a pair of fasteners 26 into firm engagement with the block 10.

Referring particularly to FIG. 2, the circular opening 20 defined by the members 10 and 14 is of a diameter substantially greater than that of the crank shaft 12 immediately adjacent thereto, and hence, sealing means are provided to control the flow of oil to the rear main bearing adjacent to the members 10 and 14. A semi-annular top seal 28 embraces the upper portion of the shaft 12 and has its free ends disposed substantially flush with the mating surface 22 of the engine block 10. It is to be appreciated that the upper seal 28 is supported in a groove shaped complementary thereto, the seal being formed preferably of oil-resistant elastomeric materials so as to provide an effective oil barrier while affording long life. The lower portion of the opening 20 is provided with a lower seal 30 made in accordance with and embodying the principles of the present invention.

Referring particularly to FIG. 3, the seal 30 includes an arcuate substantially semi-circular body member 32 having two free ends 34 and 36, provided with outwardly extending arms 38 and 40 respectively.

As will presently appear, the improved seal 30 is adapted to fit into a groove in the bearing cap 14 and to form a highly effective seal with the groove structure (not shown), such seal being non-adversely affected by variations in the grooved sides. This eliminates the necessity for precision in the formation of the groove in bearing cap 14.

Preferably, the body of 32 of the seal 30 is formed of a silicone rubber material. However, other materials of generally similar physical qualities can be used for this purpose if desired. In general, the material should be resilient, and, it should have an acceptable resistance to attack by any fluid which may come into contact with the seal 30.

The general shape of the body 32 is maintained by an internally disposed, relatively massive reinforcing core 42 formed of a strong metal such for example, as steel. Referring now to FIGS. 4, 6, and 7, the reinforcing core or ring 42 is formed to have a substantially circular shape in transverse section and is dimensioned in relation to the body 32 so that the width of the core 42 along the axis of the seal is approximately three-quarters of the corresponding overall width of the body 32 along the axis of the seal. This limits the thickness of the elastomeric body material encompassing the core 42 to provide a firmness of body structure while at the same time affording resiliency in the body 32 which enables it to accommodate and to form a tight seal with the groove structure in which the seal 30 is supported.

As viewed in transverse section, FIGS. 6 and 7, the body 32 is defined at its sides by a first side wall 44 and a second side wall 46. The side wall 44 and 46 are inclined inwardly with respect to each other toward the outer or bottom periphery of the seal 30.

The outer or bottom periphery of the body 32 is provided with two semi-annular beads 48, 50 (shown best in FIG. 7) projecting radially outward into flush relation to the side walls 44, 46 respectively and forming outward continuances of the respective surfaces 44 and 46. Intermediate the beads 48 and 50 there is disposed a crown portion 52 which defines the outer periphery of the body 32.

Upon positioning of the seal 30 in the support groove within the member 14, the beads 48, 50 engage the corners of the groove and are crammed inwardly toward each other to permit the crown portion 52 of the seal body 32 to engage the bottom of the groove. An array of circumferentially spaced apart ribs 54 extends between the crown and each of the beads 48 and 50, shown best in FIG. 4. At the apex of semi-annular seal 30 a wider rib 56 is provided extending between the beads 50, 48 and the crown 52. The ribs 54, 56 function yieldably to support the respective beads 48, 50 against the movement toward each other to insure firm engagement of the beads within the adjacent groove structure. This is of advantage in forming a seal between the body 32 and the groove in the member 14.

The body 32 provides support for a semi-annular sealing lip 58 integrally formed on the inner periphery of the body 32, shown best in FIG. 3. The lip 58, formed of the same resilient material used in the elastomeric body 32 is integrally joined to the inner periphery of the body 32 at one axial end thereof. As viewed in transverse section FIGS. 6 and 7, lip 58 cantilevers from its supported end a substantial distance along the axis of the seal to a distal or projecting end which defines a semi-annular sealing surface 60 adapted to engage a semi-circular portion of the associated crank shaft 12 to afford a tight seal therewith.

When the sealing lip 58 is in its normal condition, before being assembled around a crank shaft 12, the annular sealing surface 60 has a truncated semi-conical shape, the small end of which is most remote from the supported end of the lip 58. Moreover, the shaping of the cantilever lip 58 is such that the diameter of the crank shaft engaging the sealing surface 60 on the distal edge of the lip 58 is substantially greater than the diameter of the supported edge of the lip 58.

As shown in FIGS. 6 and 7, the lip 58 is progressively tapered or thinned from its supported edge towards its distal, marginal edge; thereby affording a thickened yieldable support rim 62 for the surface 60.

The diameter of the sealing surface 60 of the lip 58 is substantially less than the diameter of the associated crank shaft 12 whereby in the assembly of the seal 30 in operative relation to the crank shaft 12, the sealing surface 60 engages the crank shaft 12 upstream of the balance of the lip 58, forcing the rim 62 of the lip 58 to expand and move the surface 60 radially outwardly to conform to the diameter of the crank shaft 12. In being expanded diametrically and in conformance to the crank shaft 12, the initial conical sealing surface 60 assumes a cylindrical shape which engages a substantially cylindrical area of the crank shaft 12.

The sealing surface 60 is yieldably held in effective sealing engagement with the crank shaft 12 over a long service life of the seal 30 by the continuing action of the cantilevered lip 58 to yieldably seek its original form, and thereby the distal rib 62 is continuously urged towards its original disposition. At the free end 34 of the body 32, the lip 58 extends outwardly from the end 34 thereby providing a wedge shaped abutment portion 64 adapted to engage a substantially complementary recessed portion (not shown) of the upper seal 28. Conversely, at the free end 36 of the body 32 the lip 58 is downwardly beveled to form a receiving portion 66 adapted to engage a substantially complementary abutment portion provided at the end of the upper seal 28. The aforesaid upper seal portions lie more nearly on a diameter. Therefore, it will be appreciated that when the seal 30 is urged into engagemnt with the upper seal 28 the abutment and receiving portions 64 and 66 being made of elastomeric material are resiliently deformed by engagement with the substantially complementary portions on the seal 28 thereby to effect a barrier to the fluid disposed within the oil pan 12.

The arm 38 is disposed in the general plane of the semi-annular body 32 and extends outwardly therefrom in a radial direction. It is to be appreciated that the arm 38 is made of the same elastomeric material as that which forms the yieldable portion of the body 32. A base 68 of the arm 38 is integrally joined to the body adjacent to the free end 34 thereof. Outwardly of the base 68 an enlarged tip portion 70 is provided on the arm 38 and has a width in the axial direction of the seal 30 substantially greater than the width of the remaining portion of the arm 38. The tip portion 70 is symmetrically arranged about the longitudinal axis of the arm 38, which axis lies substantially on a diameter of the seal 30.

An elongated resiliently yieldable protuberance 72 is integrally formed with the upper surface of the arm 38 and is disposed along the longitudinal axis thereof. The elongated protuberance 72 is disposed outwardly of the free end 34 and extends substantially the full length of the arm 38 terminating on the tip portion 70, clearly shown in FIG. 3.

A slot or recess 74 of a size and shape complementary to that of the arm 38 is provided in the supporting member 14 to receive the arm 38 and to provide support therefor as the member 14 is urged into engagement with the engine block or other housing member 10. When urged into engagement with the mating surface 22 of the block 10, the protuberance 72 deforms or flattens and spreads along the surface of the arm 38. In this condition, the protuberance 72 provides a sealing barrier against the escape of fluid in a radial direction from between the mating surfaces 22 and 24.

Similarly, a protuberance 76 is provided on the arm 40 and is of an identical construction to the elongated protuberance 72 previously described. The arm 40 has a base portion 78 integrally joined to the body 32 adjacent the free edge 36 thereof. A tip portion 80 is provided outwardly of the base portion 78 and is of an identical size and configuration to the tip portion 70 previously described. A second recess 82 is provided in the member 14 diametrically opposite the recess 74, the recess 82 being adapted to support the arm 40 in the manner described with respect to the recess 74.

There is shown in FIG. 8 a second form of oil seal generally designated by the numeral 130 made in accordance with and embodying the principles of the present invention. The seal 130 includes elements identical to those previously described and here designated with corresponding numerals having a suffix letter "a." At the free end 36a of the body 32a an arm 132 extends outwardly therefrom in a radial direction. The arm 132 is integrally joined at a base 134 to the body 32a and has a tip portion 136 disposed outwardly from the base 134. The general configuration of the arm 132 being L-shaped, the tip 136 extends to one side of the longitudinal axis of the arm 132.

An elongated L-shaped protuberance 140 is disposed on the surface of the arm 132 so as to provide a resiliency yieldable elastomeric sealing member. The protuberance 140 is crowned in transverse cross section and is disposed longitudinally of the arm 132. At its outermost tip, the elongated protuberance 140 tapers into the surface of the tip portion 138, clearly shown in FIG. 8. It is to be appreciated that the sealing support member adapted to support the modified form 130 of the invention is provided with recesses shaped complementary to the arm 132 whereby when the arm 132 is urged against the mating surface of the engine block a radial seal is provided to prevent the escape of oil from the crank case housing.

Thus it is seen that there has been provided an improved seal for preventing leakage of fluid from between the mating surfaces of complementary members which are drawn together to form a circular opening through which a rotatable shaft concentrically projects which fulfills all of the objects and the advantages set forth above.

The principles of the invention may be embodied in various modifications and adaptations which, from the principles herein outlined, will become readily apparent to those skilled in the art. It is accordingly understood that this invention is not limited to the particular embodiments described and illustrated, and various omissions, substitutions, and changes may be made by those skilled in the art without departing from the teachings of this invention.

The invention is claimed as follows:

1. A seal for preventing seepage of fluid from between the mating surfaces of complementary first and second housing members which are drawn together to form a circular opening through which a rotatable shaft concentrically projects, the first housing member having a spaced pair of recesses in the mating surface and an arcuate support groove in communication with the recesses, said seal comprising: an arcuate body having two free ends and adapted to be received in the support groove in a manner wherein said free ends are disposed adjacent to the mating surface of the first member and the body engages said shaft; a pair of arms extending radially outwardly of said body adapted to be received in the pair of recesses in the mating surface of the first member, each arm being integrally joined at one end thereof to said body adjacent to one of said free ends of said body, the other end of each arm having an enlarged tip portion.

2. A seal for preventing seepage of fluid from between the mating surfaces of complementary first and second housing members which are drawn together to form a circular opening through which a rotatable shaft concentrically projects, the first housing member having a spaced pair of recesses in the mating surfaces thereof and an arcuate support groove in communication with the recesses, said comprising: an arcuate body having two free ends and adapted to be received in the support groove in a manner wherein said free ends are each disposed adjacent to the mating surface of the first member and said body engages said shaft; a pair of arms disposed in the general plane of said body and extending outwardly from said body each in the direction opposite to the other, said pair of arms being adapted to be received in the pair of recesses in the mating surface of the first member, each arm being integrally joined at one end thereof to said body adjacent to one of said free ends of said body, a face of said arm being disposed substantially flush with the said one free end, the other end of each arm having an enlarged tip portion; and an elastomeric protuberance elongated in the direction of each arm on said face disposed outwardly of said one free end of said body and adapted to be deformed by engagement with the mating surface of the second housing member when the first and second housing members are drawn together.

References Cited

UNITED STATES PATENTS

| | | | |
|---|---|---|---|
| 1,969,640 | 8/1934 | Curtin | 277—207 |
| 2,945,715 | 7/1960 | Burrell | 277—10 |
| 1,245,003 | 10/1917 | Martin et al. | 277—207 |
| 1,942,705 | 1/1934 | Hubbard et al. | 277—206 X |
| 2,323,548 | 7/1943 | Lewis | 277—165 |
| 2,949,325 | 8/1960 | Nanzell | 277—207 X |
| 3,003,799 | 10/1961 | Marchionda et al. | 277—206 X |

FOREIGN PATENTS 823,613   11/1959   Great Britain.

SAMUEL ROTHBERG, *Primary Examiner.*

M. M. FRITZ, EDWARD V. BENHAM, *Examiners.*

D. D. SCHAPER, *Assistant Examiner.*